2,846,408

CELLULAR POLYURETHANE PLASTICS OF IMPROVED PORE STRUCTURE AND PROCESS FOR PREPARING SAME

Franzkarl Brochhagen, Odenthal, Bezirk Koln, Fritz Schmidt, Leverkusen, and Peter Hoppe, Troisdorf, Germany, assignors to Farbenfabriken Bayer Aktiengesellschaft, Leverkusen, Germany, a corporation of Germany No Drawing. Application January 18, 1955
Serial No. 482,663

Claims priority, application Germany January 19, 1954

8 Claims. (Cl. 260—2.5)

The present invention relates to cellular plastics of improved cell structure and to a process of preparing same.

It is known in the art to prepare cellular plastics by reacting alkyd resins or other polyesters with polyisocyanates in the presence or absence of water and activators. It is also known that the cellular structure of such plastics may be varied within certain limits by the use of finely divided metallic soaps, i. e. soaps of calcium, zinc, magnesium, barium, strontium and aluminum. The effect of these soaps on such plastics is improved by adding to the foaming composition metallic leafing powders prepared by grinding aluminum, gold, silver, lead, copper or nickel. The favorable action of these additives may be attributed to the fact that the solid, insoluble soaps and metal particles stabilize the plastic film by increasing its viscosity.

In accordance with the present invention, it has been found that the pore structure of cellular plastics prepared from alkyd resins or other polyesters and polyisocyanates can be substantially improved by adding one or more of the metallic compounds hereinafter indicated, which compounds are normally liquid or become liquid at the foaming temperature. For example, by varying the amount of these additives the pore size of such cellular plastics may be varied over a wide range; also, in this manner, the extent of formation of closed pores in these products may be controlled. Moreover, the amount of these additives required to produce the above effects is considerably less than that required when employing the finely divided metal soaps of the prior art. In general, the new additives are used in an amount of 0.01-5%, preferably 0.1-1%, based on the weight of the polyester to be reacted with the polyisocyanate.

The metallic compounds used in the practice of this invention are the soaps and alcoholates of trivalent and higher valent metals which have an atomic number between 21 and 83 and preferably between 22 and 50. These metallic compounds are defined by the following general formula:

$$Me(OR)_mX_{n-m}$$

wherein R is selected from the group consisting of aliphatic, cycloaliphatic and aryl hydrocarbon radicals containing at least six carbon atoms, n is the valency of the metal Me employed, X is an organic carboxylic acid radical and m is selected from the group consisting of zero and a positive integer equal to at least 1 but not more than the integer defined by the valence of the metal Me.

Illustrative examples of metal soaps within the scope of the general formula are salts of organic aliphatic, cycloaliphatic, aromatic or araliphatic carboxylic acids with trivalent metals such as tin, zirconium or titanium, which salts may be prepared in any suitable manner but most advantageously by the method of German Patent 880,292. Typical organic acids which may be used in the production of these metal soaps are lauric acid, palmitic acid, stearic acid, naphthenic acid, phenylacetic acid, oleic acid, and the $C_6$–$C_{12}$ fatty acid first runnings of the oxidation of paraffin, etc.

In contrast to the above-mentioned soaps of the divalent metals and aluminum, the tri-, tetra- and higher valent metal soaps used in the practice of the present invention are completely soluble in many organic solvents. These fine dispersions or homogeneous solutions of the above metal soaps effect in an astonishing manner a considerably better pore structure than that producible in known manner with insoluble, pulverized metal soaps of the above-mentioned type.

As illustrative examples of alcoholates within the scope of the above general formula which may be employed in carrying out the present invention, there may be mentioned the alcoholates of the trivalent metals and particularly the tetravalent metals with higher fatty alcohols, such as titanium tetradodecylate, zirconium tetraoctadodecylate and tin tetraoctylate, etc. These compounds are as effective as the soaps of the above metals and because of their excellent solubility are readily distributed or dispersed in the plastic mass to be foamed.

The metal soaps and metal alcoholates can also be employed in admixture with filling, dyeing and other additive agents.

In carrying out the foaming operation, the conventional methods are employed. Thus, the additive, an activator, such as a tertiary amine, and a small amount of water may be added to the polyester, whereupon the polyisocyanate is added to the mixture. Alternatively, the reactants may be injected into a mixing chamber by means of nozzles, intensely homogenized in the mixing chamber, and subsequently introduced into molds where cross-linking is effected. The latter process is described in German Patent 901,471.

The invention is illustrated but not limited by the following examples in which parts are expressed by weight.

Example 1

80 parts of a polyester prepared from 0.5 mol of phthalic acid, 2.5 mols of adipic acid and 4 mols of trimethylolpropane are mixed with 20 parts of a polyester prepared from 14 mols of adipic acid and 15 mols of diethylene glycol. To this mixture are added 10 parts of starch, 0.5 part of a reaction produce of 1 mol of tetrabutyl titanate with 4 mols of first runnings $C_9$–$C_{11}$ fatty acids, 3.5 parts of Turkey red oil (water content 50%) and 2 parts of an esteramine prepared from adipic acid and diethylethanolamine. After mixing thoroughly, 60 parts of toluylene diisocyanate are stirred into the resulting mass. A hard cellular plastic of uniform pore structure is obtained, which exhibits a very slight tendency to absorb water.

When employing the finely divided metal soaps of the prior art a considerably higher amount of the same is required in order to produce a cellular plastic of similar pore structure. Thus, 2 parts of zinc stearate would be required in place of 0.5 part of the above reaction product in the case of the instant example.

Example 2

80 parts of a polyester prepared from 0.5 mol of phthalic acid, 2.5 mols of adipic acid and 4 mols of trimethylolpropane are mixed with 20 parts of a polyester prepared from 1.5 mols of adipic acid, 1.0 mols of 1,3-butylene glycol and 1 mol of hexanetriol. Into this mixture are stirred 0.5 part of a reaction product of 1 mol of tetrabutyl zirconate and 2 mols of first runnings $C_9$–$C_{11}$ fatty acids and 8 parts of an activator mixture consisting of 10 parts Turkey red oil ($H_2O$ content 50%) and 2 parts of an esteramine of adipic acid and diethylethanolamine. After reaction with 80 parts of toluylene diisocyanate, a hard cellular plastic having uniform pore size and essentially closed cells is obtained.

Example 3

100 parts of a polyester prepared from 27 mols of adipic acid, 28 mols of diethylene glycol and 1 mol of trimethylolpropane are mixed with 1 part of the tetradodecyl ester of titanic acid and 25 parts of toluylene diisocyanate. After reaction with 6.5 parts of an activator mixture consisting of 3 parts of an esteramine of adipic acid and diethylethanolamine, 2 parts of oleic acid diethylamine and 1.5 parts of water, an elastic cellular plastic having pores with a diameter of about 2 mm. and an essentially closed cell structure is obtained.

Example 4

80 parts of a polyester prepared from 0.5 mol of phthalic acid, 2.5 mols of adipic acid and 4 mols of hexanetriol are mixed with 20 parts of a polyester prepared from 2 mols of phthalic acid, 10 mols of adipic acid, 17 mols of hexanetriol and 1 mol of triethanolamine. To this polyester mixture are added 10 parts kieselguhr, 0.5 part of a reaction product of 1 mol tetrabutyl stannate and 2.5 mols coconut oil acid, and 8 parts of an activator mixture consisting of 10 parts Turkey red oil ($H_2O$ content 50%) and 2 parts of an esteramine of adipic acid and diethylethanolamine. After reaction with 78 parts toluylene diisocyanate, a hard cellular plastic having pores with a diameter of about 3 mm., which exhibits a very slight tendency to absorb water, is obtained.

Example 5

70 parts of a polyester prepared from 0.5 mol of phthalic acid, 2.5 mols of adipic acid and 4 mols of hexanetriol are mixed with 30 parts of a polyester prepared from 14 mols of adipic acid and 15 mols of diethylene glycol. To this mixture are added 10 parts of animal charcoal, 1 part of a reaction product of 1 mol of chromium tributylate and 2 mols of first runnings $C_9$–$C_{11}$ fatty acids and 6 parts of an activator mixture consisting of 10 parts of Turkey red oil ($H_2O$ content 50%) and 3 parts of an esteramine of adipic acid and diethylethanolamine. After reaction with 65 parts of toluylene diisocyanate, a semirigid cellular plastic with closed pores is obtained.

Example 6

To 100 parts of a polyester prepared from 3 mols of adipic acid, 3 mols of diethylene glycol and 0.5 mol of trimethylolpropane are added 0.8 part tin tetraoctylate and 25 parts toluylene diisocyanate. After reaction with 6.5 parts of an activator mixture (prepared as described in Example 3), an elastic cellular plastic with a pore diameter of about 1.5 mm. and excellent elasticity is obtained.

Example 7

70 parts of a polyester prepared from 0.5 mol of phthalic acid, 2.5 mols of adipic acid and 4 mols of trimethylolpropane are mixed with 30 parts of a polyester prepared from 1.5 mols of adipic acid, 1.0 mol of 1,3-butylene glycol and 1 mol of hexanetriol. Into this mixture are stirred 0.7 part of a reaction product of the iron salt of coconut oil acid and 6 parts of an activator mixture consisting of 10 parts of Turkey red oil (50% water content) and 2 parts of an esteramine from adipic acid and diethylethanolamine. After reaction with 65 parts of toluylene diisocyanate, a hard cellular plastic is obtained in the form of a uniformly porous structure having large closed cells.

Example 8

80 parts of a polyester prepared from 27 mols of adipic acid, 28 mols of diethylene glycol and 1 mol of trimethylolpropane are mixed with 20 parts of an isocyanate polyester prepared from 3.5 mols of adipic acid, 4.5 mols of ethylene glycol and 2 mols of toluylene diisocyanate, 0.3 part of the iron salt of oleic acid and 21 parts of toluylene diisocyanate. 6.5 parts of an activator mixture consisting of 3 parts of an esteramine of adipic acid and diethylethanolamine, 2 parts of oleic acid diethylamine and 1.5 parts water are added and a tear-resistant elastic cellular plastic having pores with a diameter of about 3 mm. and closed cell structure is produced.

What is claimed is:

1. A process for preparing a cellular plastic with an improved cellular structure from a composition comprising water, an organic polyisocyanate and a polyester prepared by reacting a dicarboxylic acid and an alcohol selected from the group consisting of a trihydric alcohol and a glycol which comprises adding to the composition from about 0.01 percent to about 5 percent based on the weight of the polyester of a compound selected from the group consisting of soaps and alcoholates of metals having the formula $$Me(OR)_m X_{n-m}$$

wherein Me is a metal having an atomic number of from 21 to 83, R is selected from the group consisting of aliphatic, cycloaliphatic and aryl hydrocarbon radicals containing at least six carbon atoms, n is the valency of the metal Me employed and is at least 3, X is an organic carboxylic acid radical and m is selected from the group consisting of zero and a positive integer equal to at least 1 but not more than the integer defined by the valance of metal Me, and effecting chemical reaction between the polyisocyanate and polyester with accompanying foaming of the said composition.

2. The process of claim 1 wherein Me is tin.
3. The process of claim 1 wherein Me is titanium.
4. The process of claim 1 wherein Me is zirconium.
5. The process of claim 1 wherein Me is iron.
6. The process of claim 1 wherein Me is chromium.
7. In the manufacture of a cellular plastic from a reaction mixture containing a polyester prepared by reacting a dicarboxylic acid and an alcohol selected from the group consisting of a trihydric alcohol and a glycol and an organic polyisocyanate, the step of incorporating from about 0.01 percent to about 5 percent based on the weight of the polyester of a compound selected from the group consisting of a soap and an alcoholate of a metal having the formula $$Me(OR)_m X_{n-m}$$

wherein Me is a metal having an atomic number of from 21 to 83, R is selected from the group consisting of aliphatic, cycloaliphatic and aryl hydrocarbon radicals containing at least six carbon atoms, n is the valency of the metal ME employed and is at least 3, X is an organic carboxylic acid radical and m is selected from the group consisting of zero and a positive integer equal to at least 1 but not more than the integer defined by the valence of metal Me.

8. A reaction mixture adapted to form a cellular plastic when mixed with water comprising an organic polyisocyanate, a polyester prepared by reacting a dicarboxylic acid and an alcohol selected from the group consisting of a trihydric alcohol and a glycol and from about 0.01 percent to about 5 percent based on the weight of the polyester of a compound selected from the group consisting of a soap and an alcoholate of a metal having the formula $$Me(OR)_m X_{n-m}$$

wherein Me is a metal having an atomic number of from 21 to 83, R is selected from the group consisting of aliphatic, cycloaliphatic and aryl hydrocarbon radicals containing at least six carbon atoms, $n$ is the valency of the metal Me employed and is at least 3, X is an organic carboxylic acid radical and $m$ is selected from the group consisting of zero and a positive integer equal to at least 1 but not more than the integer defined by the valence of metal Me.

References Cited in the file of this patent

UNITED STATES PATENTS

| | | |
|---|---|---|
| 2,577,280 | Simon et al. | Dec. 4, 1951 |
| 2,577,281 | Simon et al. | Dec. 4, 1951 |
| 2,683,729 | Seeger et al. | July 13, 1954 |

FOREIGN PATENTS

| | | |
|---|---|---|
| 155,731 | Australia | Mar. 17, 1954 |

UNITED STATES PATENT OFFICE
CERTIFICATE OF CORRECTION

Patent No. 2,846,408                                                                     August 5, 1958

Franzkarl Brochhagen et al.

It is hereby certified that error appears in the printed specification of the above numbered patent requiring correction and that the said Letters Patent should read as corrected below.

Column 1, line 67, for "trivalent" read -- tetravalent --; column 2, line 49, for "produce" read -- product --.

Signed and sealed this 30th day of June 1959.

(SEAL)
Attest:

KARL H. AXLINE
Attesting Officer

ROBERT C. WATSON
Commissioner of Patents